US006452907B1

(12) United States Patent
Levin

(10) Patent No.: US 6,452,907 B1
(45) Date of Patent: Sep. 17, 2002

(54) METHOD FOR MONITORING UNUSED BINS IN A DISCRETE MULTI-TONED COMMUNICATION SYSTEM

(75) Inventor: Howard E. Levin, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/173,380

(22) Filed: Oct. 15, 1998

(51) Int. Cl.[7] .................................................. H04J 1/16
(52) U.S. Cl. ...................................... 370/252; 370/493
(58) Field of Search ................................ 370/252, 493, 370/494, 495, 482, 484

(56) References Cited

U.S. PATENT DOCUMENTS

| | | | |
|---|---|---|---|
| 4,328,581 A | 5/1982 | Harmon et al. ................. 351/8 |
| 4,833,706 A | 5/1989 | Hughes-Hartogs ........... 379/98 |
| 5,400,322 A | 3/1995 | Hunt et al. .................... 370/19 |
| 5,429,477 A | 7/1995 | Sikorski et al. ............. 415/119 |
| 5,475,864 A | 12/1995 | Hamabe .................... 455/33.1 |
| 5,548,819 A | 8/1996 | Robb ............................ 455/59 |
| 5,596,604 A | 1/1997 | Cioffi et al. ................ 345/260 |
| 5,598,435 A | 1/1997 | Williams .................... 375/261 |
| 5,603,082 A | 2/1997 | Hamabe .................... 455/33.1 |
| 5,790,550 A | 8/1998 | Peeters et al. .............. 370/480 |
| 6,122,247 A | * 9/2000 | Levin et al. ................. 370/210 |
| 6,259,746 B1 | * 7/2001 | Levin et al. ................. 370/468 |
| 6,275,522 B1 | * 8/2001 | Johnson et al. ............. 370/252 |
| 6,317,495 B1 | * 11/2001 | Gaikwad et al. ............ 370/201 |

OTHER PUBLICATIONS

"Network and Customer Installation Interfaces—Asymmetric Digital Subscriber Line (ADSL) Metallic Interface," ANSI T1.413—1998; Draft American National Standard for Telecommunications.

"A Practical Discrete Multitone Transeiver Loading Algorithm for Data Transmission over Spectrally Shaped Channels," Chow, et al; IEEE Transactions on Communications, vol. 43, No. 2/3/4, Feb./Mar./Apr. 1995; pp. 773–775.

"DMT Information Bus for Multidrop Interface on Existing Wiring" Cioffi; DMT Info Bus (94–126); Jun. 4, 1994; pp. 1–6.

* cited by examiner

Primary Examiner—Melvin Marcelo
(74) Attorney, Agent, or Firm—Robert L. King

(57) ABSTRACT

A method of monitoring carriers in a multi-carrier communication system (10) enables unused carriers to periodically transmit data during real-time operation so that the carrier characteristics such as Signal-to-Noise Ratio values and equalizers may be updated regularly. Based on the updated information, bit swapping, dynamic rate adaption, and other features may be readily implemented.

29 Claims, 3 Drawing Sheets

| BIN | BIT ALLOCATION | FINE GAINS | MONITOR DATA |
|---|---|---|---|
| 1 | 0 | 0 | 0 |
| 2 | 0 | 1 | 1 |
| 3 | 2 | .75–1.33 | X |
| 4 | 15 | .75–1.33 | X |
| 5 | 14 | .75–1.33 | X |
| 6 | 0 | 1 | 1 |
| 7 | 0 | 1 | 1 |
| 8 | 5 | .75–1.33 | X |
| 9 | 10 | .75–1.33 | X |
| 10 | 0 | 1 | 1 |
| 11 | 0 | 1 | 1 |
| 12 | 0 | 0 | 0 |
| 13 | 0 | 0 | 0 |
| 14 | 10 | .75–1.33 | X |
| ⋮ | ⋮ | .75–1.33 | X |
| | | 1 | 1 |
| MAX | 0 | | |

| BIN | BIT ALLOCATION | FINE GAINS | MONITOR DATA |
|---|---|---|---|
| 1 | 0 | 0 | 0 |
| 2 | 0 | 1 | 1 |
| 3 | 2 | .75-1.33 | X |
| 4 | 15 | .75-1.33 | X |
| 5 | 14 | .75-1.33 | X |
| 6 | 0 | 1 | 1 |
| 7 | 0 | 1 | 1 |
| 8 | 5 | .75-1.33 | X |
| 9 | 10 | .75-1.33 | X |
| 10 | 0 | 1 | 1 |
| 11 | 0 | 1 | 1 |
| 12 | 0 | 0 | 0 |
| 13 | 0 | 0 | 0 |
| 14 | 10 | .75-1.33 | X |
| ⋮ | ⋮ | .75-1.33 | X |
|  |  | 1 | 1 |
| MAX | 0 |  |  |

METHOD FOR MONITORING UNUSED BINS IN A DISCRETE MULTI-TONED COMMUNICATION SYSTEM

CROSS-REFERENCE TO RELATED APPLICATIONS

A related application entitled "Method for Allocating Data in a Data Communication System," by Levin, and having application Ser. No. 08/660,380, has been previously filed, and is now U.S. Pat. No. 5,852,633.

A related application entitled "Method and Apparatus for Configuring a Communication System," by Levin, and having application Ser. No. 08/937,759, has been previously filed, and is now U.S. Pat. No. 6,130,882, and continued as application Ser. No. 09/451,532 filed on Dec. 1, 1999.

A related application entitled "Method For Fine Gains Adjustment In An ADSL Commnunications System" by Levin, and having application Ser. No. 08/660,339, has been previously filed, and is now U.S. Pat. No. 5,822,374.

A related application entitled "Method For Allocating Data and Power In A Discrete Multi-Tone Communication System" by Johnson, and having application Ser. No. 09/007,390 has been filed on Jan. 14, 1998 and is now U.S. Pat. No. 6,275,522.

A related application entitled "Method for Allocating Data and Power in a Discrete Multi-Tone Communication System" by Levin, and having application Ser. No. 09/007,218 has been filed on Jan. 14, 1998 and is now U.S. Pat. No. 6,259,746.

FIELD OF THE INVENTION

This invention relates generally to a communication system and more specifically to a method for monitoring unused bins in a multi-channel communication system.

BACKGROUND OF THE INVENTION

In order to make high data rate interactive services such as video conferencing and internet access available to more residential and small business customers, high speed data communication paths are required. Although fiber optic cable is the preferred transmission media for such high data rate services, it is not readily available in existing communications networks, and the expense of installing fiber optic cable is prohibitive. Current telephone wiring connections, which consist of twisted pair media, were not designed to support the high data rates required for interactive services such as video on demand or even high speed interconnects. In response, Asymmetrical Digital Subscriber Line (ADSL) technology has been developed to increase the transmission capabilities within the fixed bandwidth of existing twisted pair connections, allowing interactive services to be provided without requiring the installation of new fiber optic cable.

Discrete Multi-Tone (DMT) is a multi-carrier technique that divides the available bandwidth of a communications channel such as a twisted pair connection into a number of frequency sub-channels. These sub-channels are also referred to as frequency bins or carriers. The DMT technique has been adopted by the ANSI T1E1.4 (ADSL) committee for use in ADSL systems. In ADSL, DMT is used to generate 250 separate 4.3125 kHz sub-channels from 26 kHz to 1.1 MHz for downstream transmission to the end user, and 25 sub-channels from 26 kHz to 138 kHz for upstream transmission by the end user. Each bin is allocated a number of bits to send with each transmission. The number of bits allocated to an ADSL system are 0, and 2-15 bits.

Prior to transmitting real-time data with an ADSL system, an initialization process occurs. During a first portion of the initialization process, an activation and acknowledgment step occurs. It is during this step that a transmit activation tone is generated following power-up of the ADSL system. Transceiver training is the next step of the initialization process. During transceiver training, the equalization filters of the ADSL system are trained and system synchronization is achieved. Next, channel analysis and exchange are performed as part of the initialization processes. During the channel analysis and exchange, the Signal to Noise Ratio (SNR) of the channels is determined, and bit loading configuration of the bins and other configuration information is transferred.

Used and unused bins are a result of the bit loading process described above. During real-time operations, when real data is being sent, used carriers are those bins which transmit real data in order to maintain a specific data rate. Unused bins are those bins that are not needed to maintain the data rate, and therefore do not transmit real data. In one implementation of the ADSL specification, the unused bins have no transmit power associated with them. Without transmit power on unused bins, power consumption is minimized, but it is not possible to update equalizers, or measure channel characteristics of these unused bins. Therefore, once a bin was set up as unused in the initialization process, further use of the bin would be unwise to use in the future because of the unknown channel characteristics.

Other implementations of the ADSL specification allow transmit power to be associated with all unused bins simultaneous to transmission of power/user data on used bins. However, these implementations require either all bins be off, all bins be on, or some predefined number bins be on in order to allow for measurements and equalization based on data frames. Therefore, in order to assure optimal coverage of the unused channels, it would be necessary for all bins to be on in order to monitor any change in characteristics associated with these unused bins. However, such an implementation would require increased CPU power, in order to continuously transmit energy and monitor the characteristics associated with the unused bins, would cause an increase in total power needed to drive the ADSL system, and in addition, would cause interference on adjacent ADSL systems.

Therefore, a flexible method to facilitate the transmission of energy on unused bins simultaneously to transmitting real data on used bins by the transmitter, and monitoring the unused bins simultaneously to receiving real data on used bins at the receiver which overcomes the prior art problems would be beneficial.

BRIEF DESCRIPTION OF THE DRAWINGS

The invention will be described with reference to the following figures.

DETAILED DESCRIPTION OF THE DRAWINGS

In one embodiment of the present invention, unused carriers, in a multi-channel communications system are periodically monitored during data frames in order to update equalizers and carrier characteristics associated with individual carriers. During normal operation, i.e. not during initialization, an instruction is sent from one transceiver to a second transceiver to indicate an unused bin is to be turned on or turned off. By sequentially turning unused bins on and off, it is possible to efficiently maintain current information of each unused bin. By determining which unused bin has the most desirable characteristics, overall system performance can be easily updated by bit swapping to the best unused bin. Bit swapping is a technique used to deallocate one or more bits from one bin and reallocate them to one or more different bins.

Figures 1, 2:
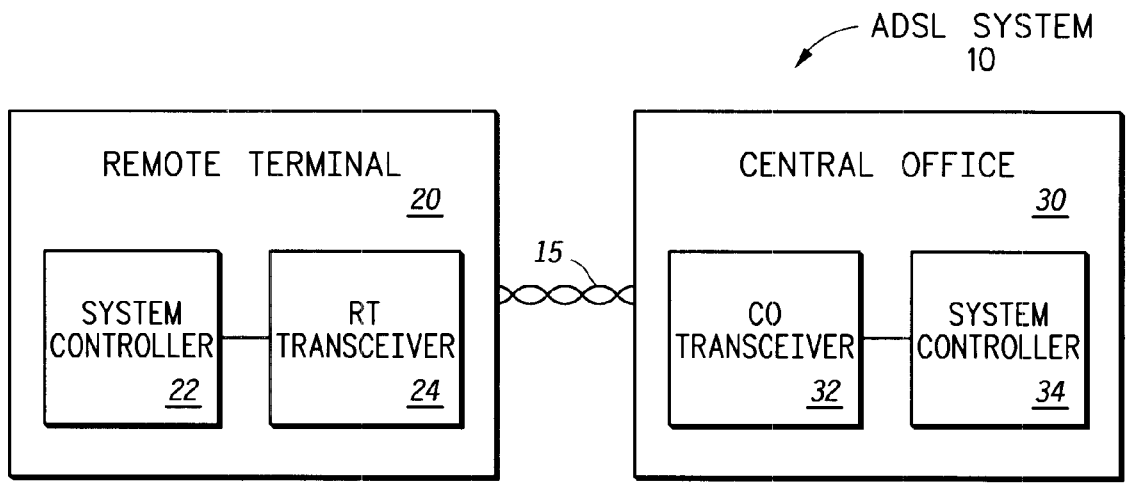
FIG. 1 illustrates an ADSL system in block form.
FIG. 2 illustrates an example of bin information, in tabular form, associated with the ADSL system.

FIG. 1 illustrates an ADSL system 10. The ADSL system 10 comprises a remote terminal 20, and a central office 30 connected by a twisted pair transmission media. The remote terminal 20, and central office 30, each comprise a system controller 22 and 34 respectively. In addition, the remote terminal 20, and central office 30, respectively comprise a transceiver 24 and 32. The ADSL system 10 is capable of implementing the present invention. In operation, the central office 30 transmits downstream data across the transmission media 15 to the remote terminal 20. The data is received at the remote terminal 20 by the transceiver 24, which provides the receive data to the system controller 22 for further processing. In a likewise fashion, the upstream data would be transmitted from the remote terminal 20, across the transmission media 15, and received by the central office transceiver 32, which provides the data to the system controller 34. In other embodiments, there can be numerous central office portions of the ADSL system 10 located adjacent to one another at a central location. Likewise, it would be possible for multiple remote terminals to be closely adjacent to another at a remote site.

FIG. 2 illustrates a table containing specific carrier information. Specific information for bins 1 through 14, and the MAX bin are illustrated. Column 2 illustrates bit allocation values. Bit allocation values indicate the number of bits that are to be transmitted during each transmit data frame portion. In one implementation of a multibit communication system, a zero, or inactive bit, indicates that the bin is unused and, therefore, no bits are allocated to that bin. A 2 represents the minimum number of bits that can be sent in one embodiment. In other words, carrier 3 is configured to transmit, or receive, two bits. Carrier 4 is configured to fifteen bits, which represents the maximum number of bits which can be sent in one embodiment. In the specific embodiment being discussed, it is not possible to transmit only 1 bit of data. In the table of FIG. 2, bins 1, 2, 6, 7, 10, 11, 12, 13, and MAX are unused bins and therefore contain a bit allocation value of zero.

The next column in FIG. 2 contains fine gains information for each bin. For a used bin, the fine gains information indicates a small transmit power adjustment that is to be applied to that specific bin in order to equalize the bit error rates among the bins. In a specific implementation of the present invention, an unused carrier can have a fine gains value of either zero or a 1. A fine gains adjustment value of zero indicates that the unused bin is never to have real data transmitted data associated with it. However, an unused bin having a fine-gains adjustment value of 1 would indicate that real data may be transmitted on that bin at a later point in time. The fourth column in FIG. 2 contains Monitor Data which is left to be discussed in accordance with a specific implementation of the present invention.

Figure 3:
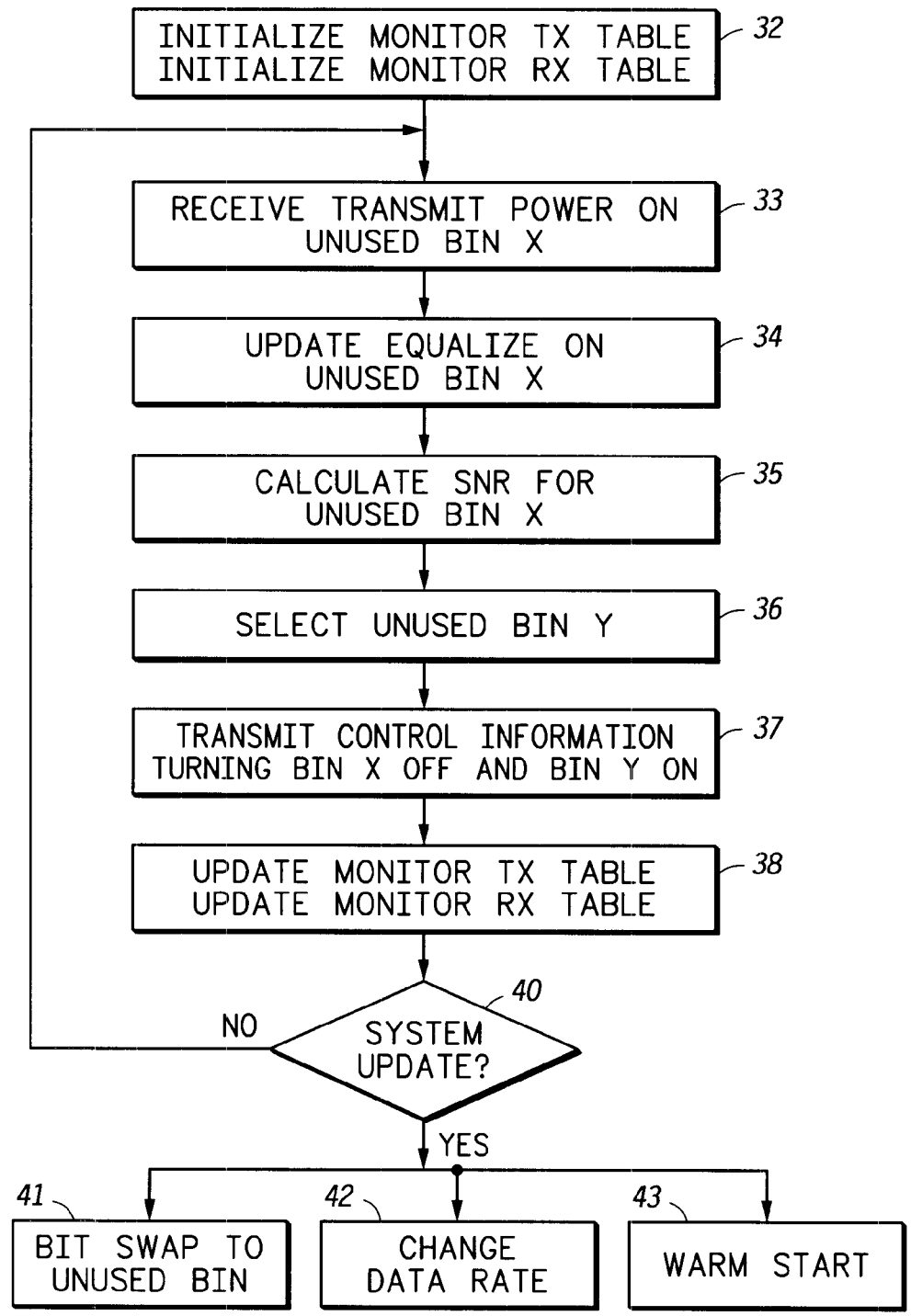
FIG. 3 illustrates, in flow diagram form, specific methods for communicating in a DMT system.

One embodiment of the present invention can be best understood with reference to FIG. 3. FIG. 3 illustrates a flow implementing a specific embodiment of the present invention. At step 32, the monitor transmit and monitor receive table is initialized. Referring to FIG. 2, the monitor transmit table is represented by the fourth column labeled Monitor Data value within FIG. 2. How the Monitor Data is initialized can be done in one of several manners.

In one embodiment of the present invention, the Monitor Data for each unused bin would be initialized to zero. A Monitor Data of zero indicates that the bin is not currently selected to have monitoring data transmitted. None of the unused bins will have any data transmitted over them when the Monitor data for each bin is inactive.

In another embodiment, the initialization of the Monitor Data can be accomplished based on the Fine Gains information, whereby the Monitor Data of the unused bin would be set active if the corresponding Fine Gains state were active for the corresponding unused carrier.

Generally, it will be desirable to analyze a subset of the unused bins at any given time in order to limit the amount of processing power needed. Therefore, for purposes of discussion it is assumed that the initialization process of step 32 initialized the Monitor Data of the transmit and receive table of FIG. 2 to zeros for all unused bins except for one active unused bin. The active unused bin has a Monitor Data Value set active.

Next, at step 33, the transmitter has transmitted monitoring data on the active unused bin. The transmitted data is received by the receiving transceiver. The actual monitoring data transmitted can be randomly selected data, such as would have been sent during an initialization process of the ADSL system, or in another embodiment, it could be beneficial to send known data to the receiving transceiver.

At Step 34, the receiver equalizer is updated based upon the information received on bin X. The equalizers associated with the unused bin X, will generally be updated in the same manner as the equalizer associated with used bins. By updating the equalizers on the unused bins, it is possible to intelligently select an unused bin when subsequent increases in performance require additional bins to be selected.

Based on the received data, channel characteristics such as the Signal-to-Noise Ratio (SNR) for the active unused carrier can be determined. By calculating the SNR, it is possible to determine bit loading capabilities and to direct bit swapping decisions accordingly. In other words, if an unused bin has an SNR or a projected SNR, that is better than that of a used bin, a bit swap between them can occur.

At a step 36, an unused bin Y is selected for analysis. In order to analyze the unused bin Y, it is necessary to communicate to the other transceiver in the system that the current active unused bin, X, is to be replaced with unused bin Y. This is accomplished in step 37.

Step 37, control information is transmitted from one transceiver to another transceiver indicating that bin X should now be turned off, or made inactive, and bin Y should be turned on, thereby making Y the active unused bin. The control information is generally transmitted as control overhead, such as data sent over the ADSL overhead control channel, which is transmitted and received during real data transfers. By turning off bin X, no monitoring data will be transmitted on bin X. By turning bin Y on, the monitoring power will be transmitted in real time operation on active unused bin Y. Next, at step 38, the Monitor Data tables are updated. In other words, referring to FIG. 2, if bin X was represented by bin 2 which has a 1 in the Monitor Data column, the control information sent to the transmitter would indicate that the Monitor Data transmit table should be updated to write a zero in the Monitor Data column of bin 2, and, in one embodiment, a 1 should be written to the Monitor Data column of bin 6. This indicates that bin 6 is the next bin to be analyzed. It should be noted that any subsequent unused bin could be chosen in any order.

Step 40, a determination is made as to whether to proceed with normal operation. If so, the method of FIG. 3 returns to step 33, where active unused bin Y is now referred to as bin X, and subsequently a new bin Y will be selected. In one embodiment, if at decision point 40 it is determined that a system update is to occur, the flow proceeds to one or all of the step 41, 42 or 43.

At step 41 indicates a bit swap occurs between a used bin to a previously unused bin. In one embodiment of the present invention, the best unused bin, is used by allocating at least one bit from a used bin. Generally, the unused bin is the bin with the greatest SNR. As a result of a bit swap, an update to the Bit Allocation Data, Fine Gains Data, and Monitor Data in the table of FIG. 2 occurs. It should be noted, that in an embodiment where the minimum amount of data that can be transmitted on a given bin is 2, that at least two bits must be swapped into the previously unused bin. This is an advantage over the prior art, in that the equalizer and SNR for the previously unused carrier kept up-to-date using a minimized amount of power.

At step 42, the actual data rate of the system is changed. This allows for dynamic rate adaptation. By keeping the equalizers and current SNR calculations up-to-date in accordance with the embodiments herein, it is possible to increase or decrease the data rate accurately by modifying the Bit Allocation and Fine Gains entries in the table of FIG. 2, and minimize the overall system power. This is an advantage over the prior art, in that it allows for optimal dynamic rate adaptation without having to operate at full power.

Step 43 indicates that a warm start can be performed in accordance with one embodiment of the present invention. A warm start refers to bringing an ADSL system out of an extended idle period during real-time operation. During such an idle period, it would be possible to use an alternate table entry, or modify the table of FIG. 2, in order to mark all of the bins, whether used or unused as effectively unused bins. Therefore, during an idle period when no real data is being transmitted, it would be possible to cycle through each bin one at a time thereby reducing the amount of interference introduced, and the amount of power used, by a system, but yet maintain the appropriate equalizer and SNR information. Subsequently, following a long idle period, a warm start could be readily performed by modifying values in the table of FIG. 2.

The method described in FIG. 3 has several advantages over the prior art where it was not possible to monitor the current status information on unused bins because no power, or data, was being transmitted, or alternatively, all bins, or a fixed number of bins had transmit power, data, associated with them, thereby reducing the flexibility and increasing the cost. The present invention allows for dynamic monitoring of the unused bins thereby saving system overhead and power. In addition, the present invention allows for better bit swapping decisions to be made as well as for being able to dynamically change the transmit rates of the ADSL system, all without having to continuously transmit full power on every bin.

Figure 4:
FIGS. 4 through 6 illustrate specific instruction fields.
Figure 5:
Figure 6:

FIGS. 4 through 6 illustrate specific embodiments of control instructions that can be used. In the embodiment illustrated in FIG. 4, there is a generic header followed by a specific control field and Bin Info field. The control field, labeled MON/MOFF is for indicating whether or not the monitor table is to be modified to turn bins on or off. The Bin Info field identifies the bin or bins to be modified.

The instruction format of FIG. 5 would use a header that implicitly indicates that a monitor table is to be turned on for a specific bin identified in a Bin Info Field. Likewise, the header of the instruction format of FIG. 6 implicitly indicates that the bins are to be turned off and the bin information would follow.

Note that in each of the instructions illustrated in FIGS. 4 through 6, it is possible for multiple bins to be specified. In a specific embodiment, the header information would be designated by an 8-bit field. The 8-bit field would further comprise an opcode value in the hexadecimal range of 00–0E, 10–EF, F1–FB, and FD–FE.

In other embodiments of the present invention, it would be possible to leave a predetermined number of the best unused bins in a constant active state. In other words, a specified number of chosen bins could have a Monitor Data value set to active, chosen bins would be monitored continuously by transmitting monitoring data. Generally, the chosen bins are bins determined to be the best of the unused bins. In addition to the chosen bins, a random bin is also monitored in one embodiment to determine if any should replace one of the chosen bins as a best bin. If so, the worst chosen bin in the monitor table would be turned off and the new best bin would be turned on, therefore the total number of bins monitored is equal to the number of bins in the chosen group plus at least one.

In yet another embodiment of the present invention, it should be noted that the Monitor Data value information could be superimposed over the bit allocation information in the tables. In other words, any bin that has a zero as a Bit Allocation data value is an unused bin. Since one bit of data cannot be transmitted, in the present embodiment, it would be possible to store a 1 in the bit allocation table in order to indicate that the bin is currently being monitored by the system. In addition, other embodiments would anticipate using other table fields in addition to the Monitor Data field to describe groups of bins which will never be updated. In other words, there could be a mask associated with the Monitor Data which when the mask data is set to a predefined state for a given bin, that bin will not receive monitoring data. For example, if for some reason bins 1 through 6 are never to be used, perhaps for interference reasons, a mask could be used to block out bins 1 through 6 from ever being analyzed in accordance with the embodiments of the present invention set forth.

Yet another embodiment of the present invention uses the bit swapping messaging to communicate this info. The bit swap allows you to increase or decrease allocations by a single bit and adjust the fine gains. For carriers with 0 bits allocated, using the bit swap message to increase change the allocation field to 1 bit could indicate monitor that carrier, and changing the allocation from 1 to 0 would mean stop monitoring that carrier. Another embodiment using the bit swap messaging to communicate this info would be to change the fine gains field from 0 to 1 to make an inactive bin active, and changing a fine gain from 1 to 0 to make an active bin inactive.

In yet another embodiment to the present invention, instead of the Monitor Data of FIG. 2 being initialized to a zero, it would be possible to initialize the Monitor Data of FIG. 2 based upon other initialization information or steady state information. An example of one such information would be the fine gains information set during initialization. From the fine gains initialization it is possible to determine

What is claimed is:

1. A method of communicating over a multi-channel communication system:
   configuring a first channel of a plurality of channels to transmit real data;
   transmitting real data within the first channel;
   configuring one or more of the plurality of channels to transmit monitoring data during transmission of real data, wherein each of the plurality of channels can be configured to transmit monitoring data and each of the plurality of channels is available for use with the first channel to transmit real data in order to maintain transmission of the real data at a predetermined data rate;
   configuring one or more of the plurality of channels to be unused;
   transmitting the monitoring data;
   determining a predetermined characteristic of the one or more of the plurality of channels that transmit monitoring data; and
   selectively re-configuring which of the one or more of the plurality of channels are unused and which transmit monitoring data based upon a result of the predetermined characteristic.

2. The method of claim 1, wherein the monitoring data is random data.

3. The method of claim 1, wherein the monitoring data is predefined data.

4. The method of claim 1 further comprising a control instruction that is transmitted and received, the control instruction communicating which of the plurality of channels will transmit the monitoring data.

5. The method of claim 4, wherein the selectively re-configuring further comprises:
   performing a bit swap between one or more bits of the first channel and a predetermined one of the one or more of the plurality of channels that transmit monitoring data.

6. The method of claim 1, further comprising:
   performing a fine gains adjustment between the first channel and the one or more of the plurality of channels to adjust transmit power and equalize bit error rates.

7. The method of claim 1, wherein the step of configuring the first channel occurs during an initialization of the multi-channel communications system.

8. The method of claim 1, further comprising the step of:
   receiving a control indicator prior to configuring the one or more of the plurality of channels, wherein the control indicator specifies that the one or more of the plurality of channels should be configured to transmit monitoring data.

9. The method of claim 1, further comprising the step of:
   transmitting a control indicator specifying that the one or more of the plurality of channels will be transmitting monitoring data.

10. The method of claim 1, further comprising the steps of:
    selecting at a transmitter a first subset of unused channels from the plurality of channels to transmit monitoring data and, in response to changing a data rate of the multi-channel communication system, selecting at a receiver a second subset of unused channels from the plurality of channels to transmit monitoring data.

11. A method of communicating over a multi-channel communication system:
    configuring a first channel of a plurality of channels to communicate real data;
    configuring one or more of the plurality of channels to be an unused channel;
    communicating real data over the first channel;
    configuring the one or more of the plurality of channels to communicate monitoring data;
    communicating the monitoring data over the one or more of the plurality of channels;
    updating a receiver equalizer based upon the real data and monitoring data communicated over the plurality of channels;
    calculating a signal-to-noise ratio for each of the one or more of the plurality of channels that communicate monitoring data;
    selecting a predetermined unused one of the plurality of channels that did not communicate the monitoring data to replace with a predetermined one of the one or more of the plurality of channels that communicate the monitoring data; and
    communicating control information turning off the predetermined one of the one or more of the plurality of channels that communicate monitoring data and turning on the predetermined unused one of the plurality of channels to communicate monitoring data.

12. The method of claim 11, further comprising the steps of:
    identifying N unused channels among the plurality of channels;
    determining a channel characteristic of each of the N unused channels;
    determining the channel characteristic of the one or more of the plurality of channels to communicate monitoring data; and
    replacing one of the N unused channels with a predetermined one of the one or more of the plurality of channels to communicate monitoring data based on a comparison of the channel characteristic of the one or more of the plurality of channels to communicate monitoring data and the channel characteristic of each of the N unused channels.

13. The method of claim 12, further comprising the step of
    communicating updated channel information following the step of determining the channel characteristic of the one or more of the plurality of channels to communicate monitoring data.

14. The method of claim 13, wherein the updated channel information is communicated as control overhead, and not as real data.

15. The method of claim 13, wherein the step of communicating updated channel information includes:
    communicating updated channel information using a control instruction specifying that the one or more of the plurality of channels to communicate monitoring data is to be updated, and how the one or more of the plurality of channels to communicate monitoring data is to be updated.

16. The method of claim 11, wherein configuring the one or more of the plurality of channels to communicate monitoring data is in response to an instruction including a header.

17. The method of claim 16, wherein the instruction further includes a first field identifying the one or more of the plurality of channels.

18. The method of claim 17, wherein the instruction further includes a second field identifying whether the one or more of the plurality of channels is to be turned on or off to communicate monitoring data.

19. The method of claim 16, wherein the instruction indicates whether a used or an unused data state of a predetermined channel is to be modified, and identifies the predetermined channel.

20. The method of claim 16, wherein the header of the instruction specifies a predetermined channel is to communicate monitoring data.

21. The method of claim 16, wherein the header of the instruction specifies a predetermined channel is to transmit approximately no signal.

22. The method of claim 11, further comprising the steps of:
   determining a channel characteristic of the one or more of the plurality of channels; and
   modifying equalizer characteristics of an equalizer associated with the one or more of the plurality of channels, based on the channel characteristic of the one or more of the plurality of channels.

23. The method of claim 22, wherein the channel characteristic is a signal-to-noise value for the one or more of the plurality of channels.

24. The method of claim 11, wherein each of the one or more of the plurality of channels is not used to communicate information.

25. The method of claim 24, further comprising the step of:
   performing a bit swap between the first channel and a predetermined one of the one or more of the plurality of channels.

26. The method of claim 11, further comprising the step of:
   performing a fine gains adjustment between the first channel and one of the one or more of the plurality of channels.

27. The method of claim 11, further comprising the steps of:
   communicating an instruction indicating the one or more of the plurality of channels is configured to transmit monitoring data.

28. The method of claim 27, wherein the instruction includes a header field and a command field.

29. The method of claim 28, wherein the header includes a sequence of 8 bits having a hexadecimal value in a group of ranges comprising: 00–0E, 10–EF, F1–FB, and FD–FE.

* * * * *